US009363300B2

(12) United States Patent
Xu

(10) Patent No.: US 9,363,300 B2
(45) Date of Patent: Jun. 7, 2016

(54) SYSTEMS AND METHODS FOR VOICE COMMUNICATION

(71) Applicant: Tencent Technology (Shenzhen) Company Limited, Shenzhen (CN)

(72) Inventor: Bo Xu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 66 days.

(21) Appl. No.: 14/231,884

(22) Filed: Apr. 1, 2014

(65) Prior Publication Data

US 2014/0376415 A1    Dec. 25, 2014

Related U.S. Application Data

(63) Continuation of application No. PCT/CN2013/089876, filed on Dec. 18, 2013.

(30) Foreign Application Priority Data

Jun. 19, 2013  (CN) .......................... 2013 1 0243201

(51) Int. Cl.
  *H04L 12/18*      (2006.01)
  *H04L 29/06*      (2006.01)
  *H04L 12/58*      (2006.01)

(52) U.S. Cl.
  CPC ........ *H04L 65/1093* (2013.01); *H04L 12/1818* (2013.01); *H04L 51/04* (2013.01); *H04L 65/4038* (2013.01)

(58) Field of Classification Search
  None
  See application file for complete search history.

(56) References Cited

U.S. PATENT DOCUMENTS

| 7,603,413 | B1 * | 10/2009 | Herold ................... G06Q 10/10 455/466 |
| 8,582,475 | B1 * | 11/2013 | Marghescu ......... H04M 3/5183 370/270 |
| 2001/0048449 | A1 * | 12/2001 | Baker .................... G06Q 30/02 715/758 |
| 2002/0129112 | A1 * | 9/2002 | Maehiro ............. H04L 12/1822 709/207 |
| 2005/0262201 | A1 * | 11/2005 | Rudolph et al. .... H04L 12/1827 709/205 |

(Continued)

FOREIGN PATENT DOCUMENTS

| CN | 102158491 A | 8/2011 |
| CN | 103023913 A | 4/2013 |
| CN | 103347003 A | 10/2013 |

OTHER PUBLICATIONS

China Patent Office, Office Action issued Aug. 4, 2015, in Application No. 201310243201.X.

(Continued)

*Primary Examiner* — Marcus R Smith
*Assistant Examiner* — Duc Duong
(74) *Attorney, Agent, or Firm* — Jones Day

(57) ABSTRACT

Systems and methods are provided for voice communication. For example, multiple friendship chains are acquired from a relation server upon launching an application; a voice room is accessed via a voice server upon receipt of a voice-communication request from a user; a voice-invitation signal is sent to the relation server, the voice-invitation signal including identification of the voice room, where one or more friends of the user in the friendship chains determine whether to access the voice room based on at least information associated with the voice-invitation signal; and one or more voice connections associated with the one or more friends are established via the voice server in response to the friends accessing the voice room.

21 Claims, 9 Drawing Sheets

(56) References Cited

U.S. PATENT DOCUMENTS

| | | | |
|---|---|---|---|
| 2007/0167225 | A1 | 7/2007 | Nguyen et al. |
| 2008/0270553 | A1* | 10/2008 | Mu ................. H04L 12/581 709/206 |
| 2009/0181767 | A1* | 7/2009 | Feng ................. A63F 13/12 463/29 |
| 2010/0199340 | A1* | 8/2010 | Jonas ................. G06Q 10/10 726/8 |
| 2010/0205539 | A1* | 8/2010 | Gestsson ............ G06Q 10/107 715/752 |
| 2011/0055735 | A1* | 3/2011 | Wood ................. G06Q 10/107 715/758 |
| 2011/0061004 | A1* | 3/2011 | Tripathi ............ G06F 17/30696 715/753 |
| 2012/0110099 | A1* | 5/2012 | Fujihara ............ H04L 12/1818 709/206 |
| 2013/0179518 | A1* | 7/2013 | Quan ................ H04L 67/2823 709/206 |
| 2014/0068467 | A1* | 3/2014 | Van et al. ............ G06Q 10/107 715/758 |

OTHER PUBLICATIONS

China Patent Office, Office Action issued Oct. 10, 2015, in Application No. 201310243201.X.
Patent Cooperation Treaty, International Search Report and Written Opinion of the International Searching Authority, PCT/CN2013/089876, mailed Mar. 20, 2014.
Patent Cooperation Treaty, International Preliminary Report on Patentability, PCT/CN2013/089876, issued Dec. 22, 2015.

* cited by examiner

SYSTEMS AND METHODS FOR VOICE COMMUNICATION

CROSS-REFERENCES TO RELATED APPLICATIONS

This application is a continuation of International Application No. PCT/CN2013/089876, with an international filing date of Dec. 18, 2013, now pending, which claims priority to Chinese Patent Application No. 201310243201.X, filed Jun. 19, 2013, both applications being incorporated by reference herein for all purposes.

BACKGROUND OF THE INVENTION

Certain embodiments of the present invention are directed to computer technology. More particularly, some embodiments of the invention provide systems and methods for communication technology. Merely by way of example, some embodiments of the invention have been applied to voice communication. But it would be recognized that the invention has a much broader range of applicability.

Users often need voice communication when using some network applications. For instance, a user may need to have a voice conversation with others on a same team while playing an online game. Currently, when a plurality of users need to engage in a voice conversation when using an application, they often need to log into a voice conversation software as well as the application to enter into a voice room for voice conversation.

However, the above-noted conventional technology has some disadvantages. For example, the user needs to log into the voice conversation software, look for a designated voice room and enter the room after logging into the application in order to chat, which is a very complicated process. Meanwhile, friendship chains of different applications cannot be interconnected. For instance, the friends in the voice conversation software are not the friends in the application (e.g., a game) so that it is inconvenient for the user to search for a target friend for communication and establish voice connection with different types of friends when using the application.

Hence it is highly desirable to improve the techniques for voice communication.

BRIEF SUMMARY OF THE INVENTION

According to one embodiment, a method is provided for voice communication. For example, multiple friendship chains are acquired from a relation server upon launching an application; a voice room is accessed via a voice server upon receipt of a voice-communication request from a user; a voice-invitation signal is sent to the relation server, the voice-invitation signal including identification of the voice room, where one or more friends of the user in the friendship chains determine whether to access the voice room based on at least information associated with the voice-invitation signal; and one or more voice connections associated with the one or more friends are established via the voice server in response to the friends accessing the voice room.

According to another embodiment, a method is provided for voice communication. For example, multiple friendship chains are acquired from a relation server upon launching an application; a voice-invitation signal is received from one or more friends of a user in the friendship chains via the relation server, the voice-invitation signal including identification of a voice room; whether to access the voice room is determined based on at least information associated with the voice-invitation signal; in response to a determination to access the voice room, the voice room is accessed via a voice server; and one or more voice connections associated with the one or more friends are established.

According to yet another embodiment, a device for voice communication includes: an acquisition unit, an entry unit, a sending unit, and a connection unit. The acquisition unit is configured to acquire multiple friendship chains from a relation server upon launching an application. The entry unit is configured to access a voice room via a voice server upon receipt of a voice-communication request from a user. The sending unit is configured to send a voice-invitation signal to the relation server, the voice-invitation signal including identification of the voice room. One or more friends of the user in the friendship chains determine whether to access the voice room based on at least information associated with the voice-invitation signal. The connection unit is configured to establish one or more voice connections associated with the one or more friends via the voice server in response to the friends accessing the voice room.

In one embodiment, a device for voice communication includes: an acquisition unit, a receiving unit and a connection unit. The acquisition unit is configured to acquire multiple friendship chains from a relation server upon launching an application. The receiving unit is configured to receive a voice-invitation signal from one or more friends of a user in the friendship chains via the relation server, the voice-invitation signal including identification of a voice room. The connection unit is configured to: determine whether to access the voice room based on at least information associated with the voice-invitation signal; in response to a determination to access the voice room, access the voice room via a voice server and establish one or more voice connections associated with the one or more friends.

In another embodiment, a system for voice communication includes: a calling terminal, a called terminal, a relation server, and a voice server. The calling terminal is connected to the relation server and the voice server. The called terminal is connected to the relation server and the voice server. The calling terminal includes: a first acquisition unit configured to acquire multiple friendship chains from the relation server upon launching an application, an entry unit configured to access a voice room via the voice server upon receipt of a voice-communication request from a user, a first sending unit configured to send a voice-invitation signal to the relation server, the voice-invitation signal including identification of the voice room, where one or more friends of the user in the friendship chains determine whether to access the voice room based on at least information associated with the voice-invitation signal, and a connection unit configured to establish one or more voice connections associated with the one or more friends via the voice server in response to the friends accessing the voice room. The called terminal includes: a second acquisition unit configured to acquire the friendship chains from the relation server upon launching the application, a receiving unit configured to receive the voice-invitation signal associated with the one or more friends in the friendship chains via the relation server, and a connection unit configured to: determine whether to access the voice room based on at least information associated with the voice-invitation signal, in response to a determination to access the voice room, access the voice room via the voice server and establish the voice connections associated with the one or more friends. The relation server is configured to send the friendship chains to the calling terminal upon launching the application on the calling terminal, receive the voice-invitation signal sent by the calling terminal and send the voice-invitation signal to the called terminal. The voice server is configured to create the voice room and establish the voice connections between the calling terminal and the called terminal.

In yet another embodiment, a non-transitory computer readable storage medium includes programming instructions for voice communication. The programming instructions configured to cause one or more data processors to execute certain operations. For example, multiple friendship chains are acquired from a relation server upon launching an application; a voice room is accessed via a voice server upon receipt of a voice-communication request from a user; a voice-invitation signal is sent to the relation server, the voice-invitation signal including identification of the voice room, where one or more friends of the user in the friendship chains determine whether to access the voice room based on at least information associated with the voice-invitation signal; and one or more voice connections associated with the one or more friends are established via the voice server in response to the friends accessing the voice room.

In yet another embodiment, a non-transitory computer readable storage medium includes programming instructions for execution of electronic games. The programming instructions configured to cause one or more data processors to execute certain operations. For example, multiple friendship chains are acquired from a relation server upon launching an application; a voice-invitation signal is received from one or more friends of a user in the friendship chains via the relation server, the voice-invitation signal including identification of a voice room; whether to access the voice room is determined based on at least information associated with the voice-invitation signal; in response to a determination to access the voice room, the voice room is accessed via a voice server; and one or more voice connections associated with the one or more friends are established.

For example, the systems and methods described herein are configured for users of different friendship chains to enter a same voice room to establish voice connections to make it simple and convenient to realize voice communication.

Depending upon embodiment, one or more benefits may be achieved. These benefits and various additional objects, features and advantages of the present invention can be fully appreciated with reference to the detailed description and accompanying drawings that follow.

DETAILED DESCRIPTION OF THE INVENTION

Figure 1:
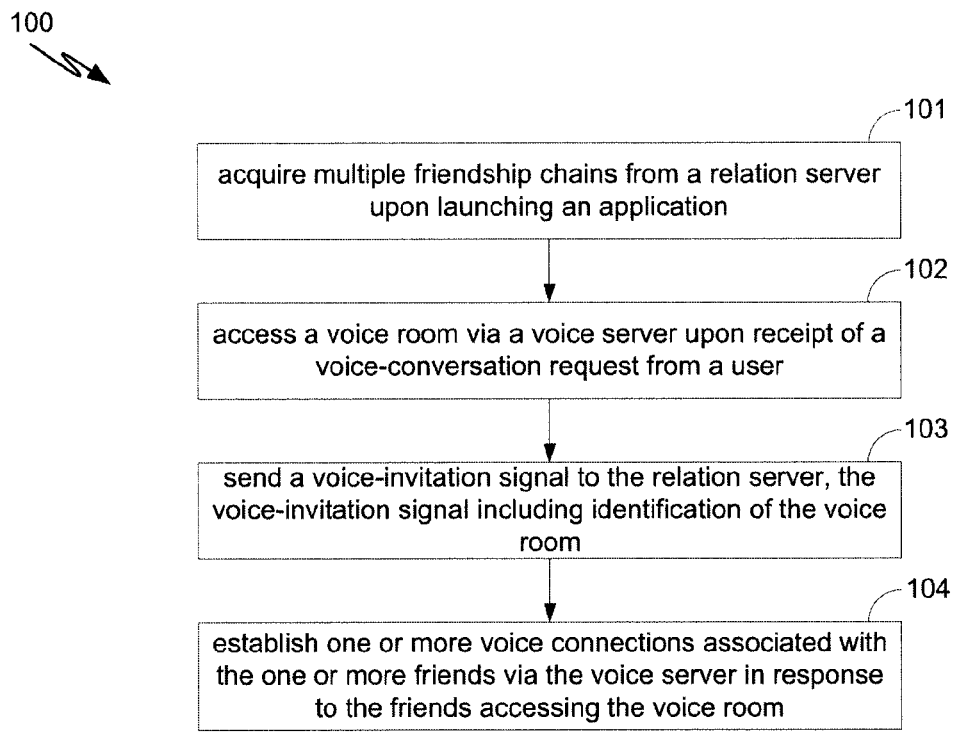
FIG. 1 is a simplified diagram showing a method for voice communication according to one embodiment of the present invention.

FIG. 1 is a simplified diagram showing a method for voice communication according to one embodiment of the present invention. This diagram is merely an example, which should not unduly limit the scope of the claims. One of ordinary skill in the art would recognize many variations, alternatives, and modifications. The method 100 includes at least the processes 101-104.

According to one embodiment, the process 101 includes: acquiring a plurality of different types of friendship chains from a relation server upon launch of an application. For example, a client associated with the application (e.g., a caller) initiates a voice request. In another example, upon launch of the application, different types of friendship chains are extracted from the relation server, such as a friendship chain in the application, a friendship chain in a voice application, a friendship chain in any instant messaging software, or other suitable type of friend chains. In yet another example, a user can select different types of relation chains to see different friendship lists and send a voice-invitation signal according to the status of the friends in different types of chains. In yet another example, the relation server includes a data center of relation chains which obtains different types of friendship chains via corresponding application interfaces. In yet another example, the user can acquire a plurality of different types of friendship chains for interconnection of these friendship chains. As an example, when using the application, the user invites other online friends in a friendship chain not associated with the application for a voice conversation. For instance, the application is an online game. Upon launch of the online game, a list of different friendship chains are obtained, such as friends in the game and friends in another software (e.g., QQ). As an example, even if one of the QQ friends of the user is not a friend in the game, the user can invite the QQ friend for a voice conversation when the QQ friend is also playing the game with the interconnection of different friendship chains.

According to another embodiment, the process 102 includes: accessing a voice room via a voice server upon receipt of a voice-communication request input by a user. For example, the user can select a friend from the list of friendship chains to initiate a voice-invitation signal, click the voice-conversation-initiation button to input a voice-communication request and access the voice room via the voice server. In another example, the process 102 includes: determining if a voice room is accessed. If the voice room is accessed (e.g., by the user), the voice room is kept accessed (e.g., by the user). Otherwise, an automatically-created voice room is accessed (e.g., by the user). In yet another example, the voice server provides services of creating a voice room and establishing voice communications. As an example, upon initiating a voice-communication request, the caller determines if there is a voice room and if the caller (e.g., associated with the user) accesses the voice room. If the caller has accessed the voice room, there is no need to create another voice room, and the caller remains in the voice room to wait for a called party to join the room. Otherwise, the caller creates another voice room automatically via the voice server, access the created voice room to wait for the called party to enter the room. As another example, the user does not need to log into a voice conversation software so that the user does not need to download and log into another application when using the present application environment so as to improve user experience.

According to yet another embodiment, the process 103 includes: sending a voice-invitation signal to the relation server, where the voice-invitation signal includes identification of the voice room, so that one or more friends in any type of friendship chain can determine whether to access the voice room according to the voice-invitation signal. For example, the voice-communication request input by the user is received. In another example, the identification of the voice room (e.g., the room number of the voice room) into which the user enters is recognized. The voice-invitation signal that contains the identification of the voice room is sent to the relation server. In yet another example, the relation server sends the voice-invitation signal to one or more friends of the user in any type of friendship chain selected by the caller and the one or more friends in any type of friendship chain can determine whether to access the voice room according to the voice-invitation signal.

In one embodiment, the process 104 includes: establishing one or more voice connections associated with the one or more friends via the voice server when the one or more friends enter the voice room. For example, if the one or more friends who receive the voice-invitation signal accept the voice-invitation signal, the friends automatically access the voice room. That is, the caller and the called party enter the same voice room (e.g., simultaneously). The one or more voice connections are established with the one or more friends via the voice server, in some embodiments.

In another example, the method 100 further includes: determining if an invitation reply is received via the relation server after the voice-invitation signal is sent to the relation server; in response to the invitation reply being received, processing the invitation reply; in response to the invitation reply including an invitation acceptance, indicating invitation success; in response to the invitation reply including a rejection of invitation, indicating invitation failure; and in response to the invitation reply not being received, terminating a process associated with the voice-invitation signal after a wait period. Further, the one or more friends can send an invitation reply to the relation server after the one or more friends determine whether to access the voice room, in some embodiments. For example, the relation server then sends the invitation reply to the caller. As an example, whether the invitation reply is received via the relation server after the caller sends the voice-invitation signal to the relation server is continuously determined. In another example, if the invitation reply contains a message of invitation acceptance, invitation success is indicated so that the user can know that the friends already enter the voice room and the voice connection can start. Otherwise, invitation failure is indicated if the invitation reply contains a message of invitation rejection. In yet another example, if no invitation reply is received, the voice invitation process is terminated after a predetermined wait period. As an example, the predetermined waiting period can be set by the user.

Figure 2:
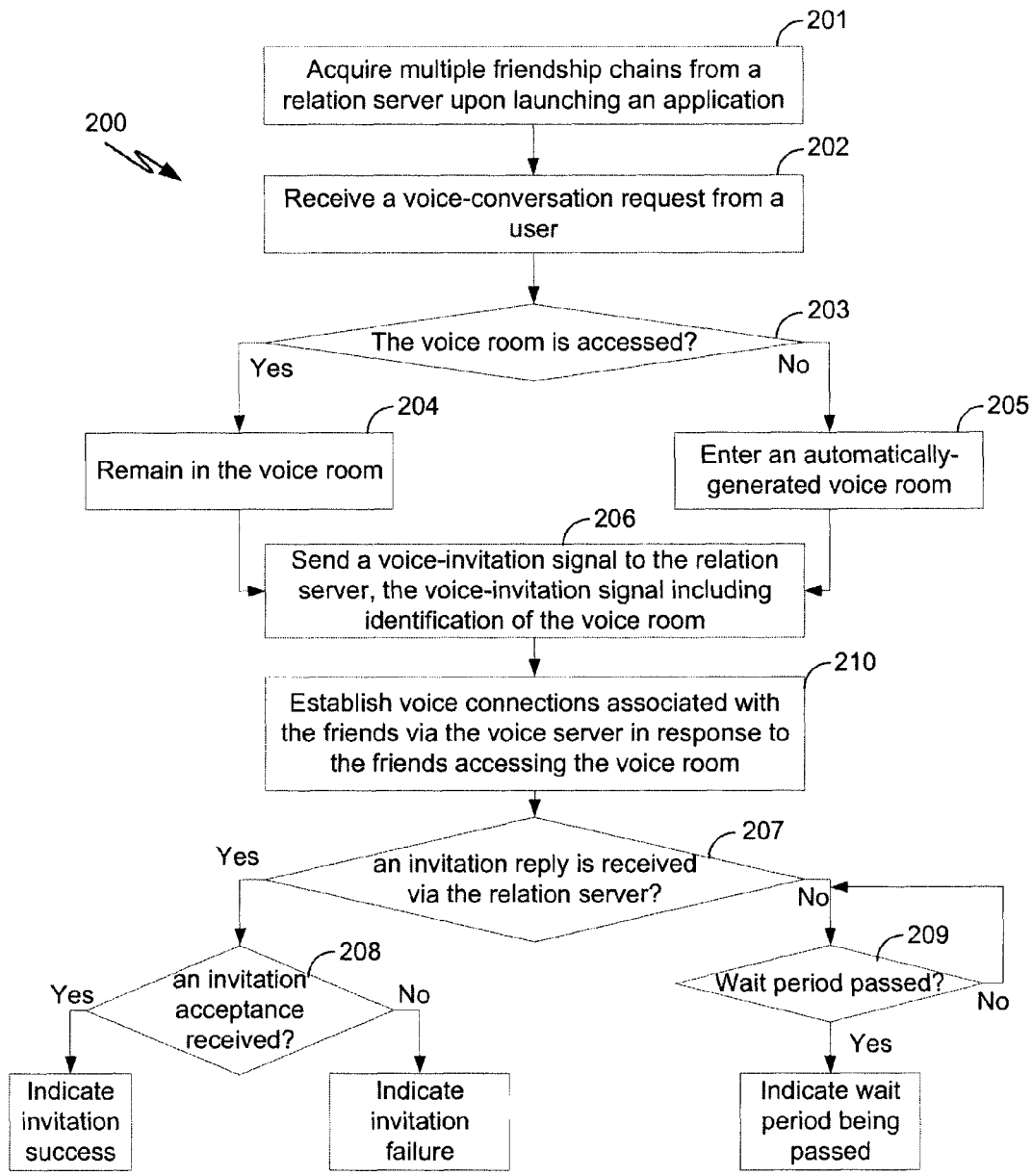
FIG. 2 is a simplified diagram showing a method for voice communication according to another embodiment of the present invention.

FIG. 2 is a simplified diagram showing a method for voice communication according to another embodiment of the present invention. This diagram is merely an example, which should not unduly limit the scope of the claims. One of ordinary skill in the art would recognize many variations, alternatives, and modifications. The method 200 includes at least the processes 201-210.

According to one embodiment, the process 201 includes: acquiring a plurality of different types of friendship chains from a relation server upon launch of an application. For example, the process 202 includes: receiving a voice-communication request from a user. In another example, the process 203 includes: determining if the user currently in a voice room. If the user is currently in the voice room, the process 204 is executed. Otherwise, the process 205 is executed. In yet another example, during the process 204, the user remains in the voice room, and the process 206 is executed.

According to another embodiment, the process 205 includes: entering an automatically-created voice room. Then, the process 206 is executed. For example, the process 206 includes: sending a voice-invitation signal to the relation server, wherein the voice-invitation signal includes identification of the voice room. In another example, the process 207 includes: determining if an invitation reply is received via the relation server. If an invitation reply is received, the process 208 is executed. Otherwise, the process 209 is executed. In yet another example, the process 208 includes: processing the invitation reply, determining if the invitation reply contains a message of invitation acceptance. In yet another example, if the invitation reply contains the invitation acceptance, invitation success is indicated. In yet another example, if the invitation reply does not contain the invitation acceptance, invitation failure is indicated.

According to yet another embodiment, the process 209 includes: determining if a wait period has passed. For example, if the wait period has passed, it is indicated that the wait period has passed, and the voice-invitation process is terminated. Otherwise, it is continuously determined whether the wait period has passed. In another example, the process 210 includes: establishing one or more voice connections associated with the one or more friends via the voice server when the one or more friends enter the voice room.

In some embodiments, the process 210 is executed after the process 206. In certain embodiments, the process 210 is executed together with the processes 207-208 simultaneously. That is, when the invited one or more friends accept the invitation and enter the voice room, the friends may send an invitation reply that contains a message of invitation acceptance via the relation server so that the caller can process the invitation reply and indicate the invitation success. In some embodiments, the method 200 is implemented to process an invitation reply to indicate the results of the invitation in a timely manner during the process of voice communication, and allow sending the voice-invitation signal to a plurality of friends in different types of friendship chains via the relation server.

Figure 3:
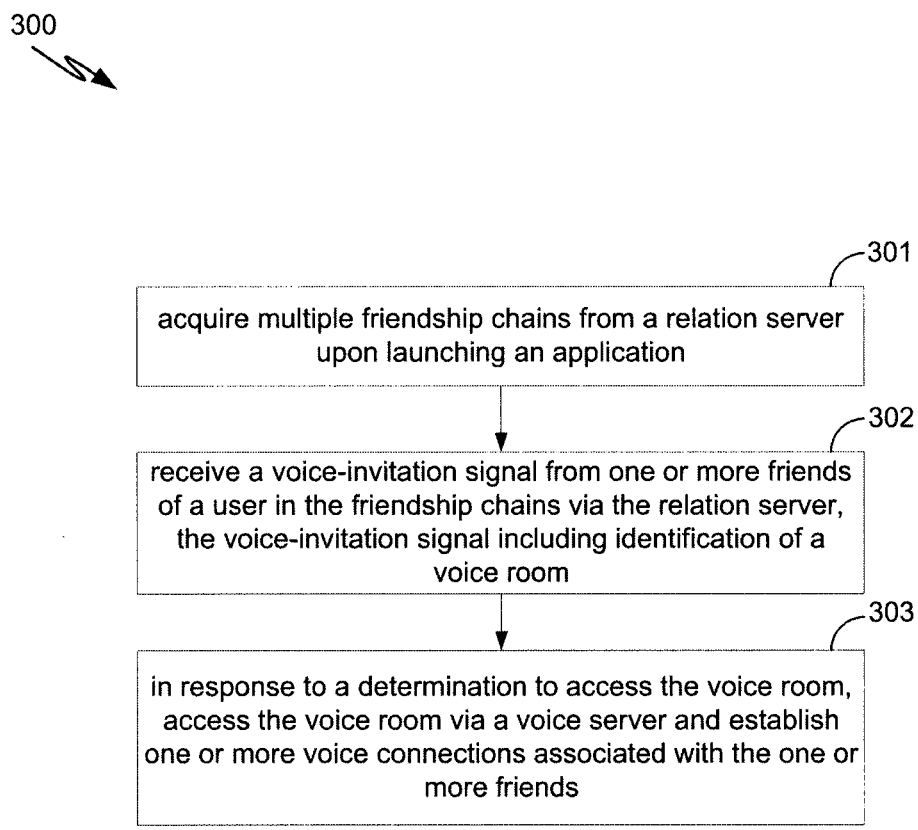
FIG. 3 is a simplified diagram showing a method for voice communication according to yet another embodiment of the present invention.

FIG. 3 is a simplified diagram showing a method for voice communication according to yet another embodiment of the present invention. This diagram is merely an example, which should not unduly limit the scope of the claims. One of ordinary skill in the art would recognize many variations, alternatives, and modifications. The method 300 includes at least the processes 301-303.

According to one embodiment, the process 301 includes: acquiring a plurality of different types of friendship chains from a relation server upon launch of an application. For example, a client associated with the application (e.g., a caller) initiates a voice request. In another example, upon launch of the application, different types of friendship chains are extracted from the relation server, such as a friendship chain in the application, a friendship chain in a voice application, a friendship chain in any instant messaging software, or other suitable type of friend chains. In yet another example, the relation server includes a data center of relation chains which obtains different types of friendship chains via corresponding application interfaces. In yet another example, the user can acquire a plurality of different types of friendship chains for interconnection of these friendship chains. In yet another example, when using the present application, the user can receive the voice-invitation signal initiated by the friends in different types of friendship chains.

According to another embodiment, the process 302 includes: receiving a voice-invitation signal sent by one or more friends in any type of friendship chain via the relation server, where the voice-invitation signal includes identification of a voice room. For example, after the voice-invitation signal is received, the voice-invitation signal can be parsed to obtain the identification of the voice room. In another example, the one or more friends in any type of friendship chain who initiate the voice-invitation signal already enter one voice room. The voice-invitation signal that contains the identification of the voice room is received via the relation server. In yet another example, if the voice-invitation signal is received, the receiving party, according to the identification of the voice room, accesses the voice room which the one or more friends in any type of friendship chain (e.g., the caller) have already accessed. Voice communication starts in some embodiments.

According to yet another embodiment, the process 303 includes: determining whether to access the voice room according to the voice-invitation signal. For example, if it is determined to access the voice room, the voice room is accessed via a voice server and one or more voice connections associated with the one or more friends are established. In another example, the voice server may provide the services of creating a voice room and establishing voice communications. When a called party receives the voice-invitation signal, the caller already enters the created voice room, in certain embodiments. For example, if the called party accepts the voice-invitation signal, the called party enters the same voice room for voice communication.

In some embodiments, the method 300 further includes: sending an invitation reply including an invitation acceptance to the relation server upon accessing the voice room, wherein the relation server provides the invitation reply to the one or more friends. For example, the method 300 further includes: determining whether to access the voice room based on at least information associated with the voice-invitation signal; in response to a determination not to access the voice room, sending an invitation reply including a rejection of invitation to the relation server, wherein the relation server provides the invitation reply to the one or more friends so that the one or more friends who initiate the voice-invitation signal can identify if the called party has entered the voice room.

Figure 4:
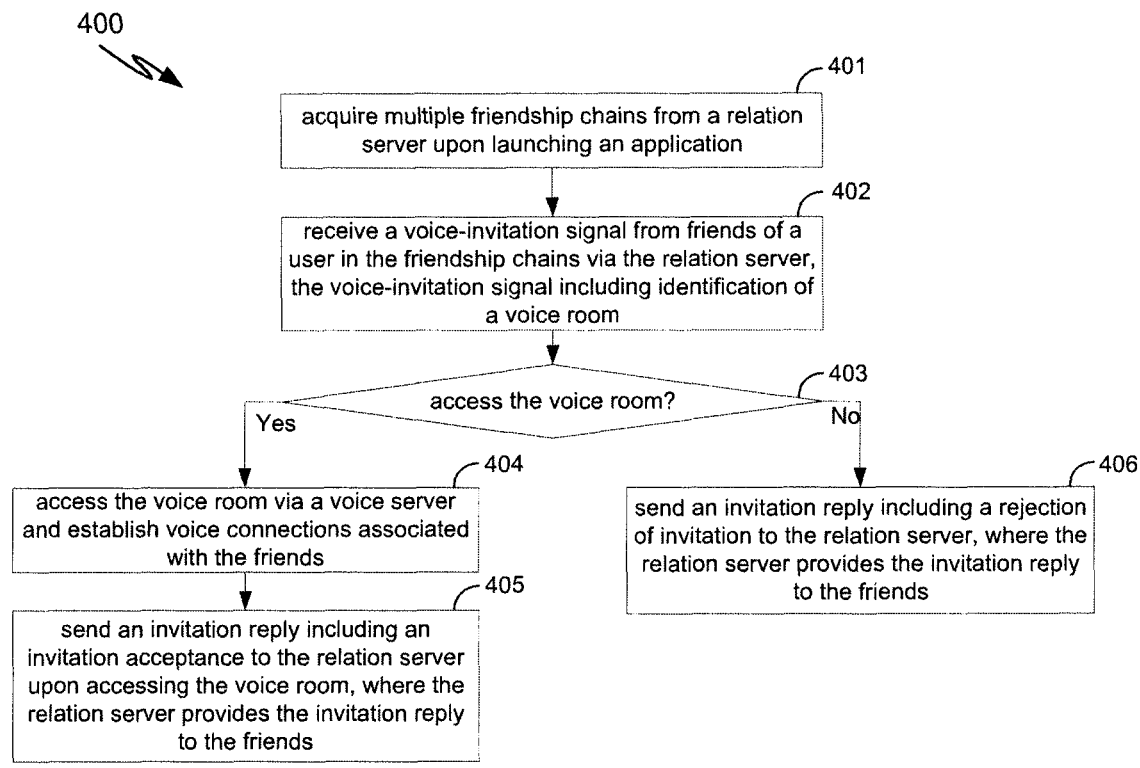
FIG. 4 is a simplified diagram showing a method for voice communication according to yet another embodiment of the present invention.

FIG. 4 is a simplified diagram showing a method for voice communication according to yet another embodiment of the present invention. This diagram is merely an example, which should not unduly limit the scope of the claims. One of ordinary skill in the art would recognize many variations, alternatives, and modifications. The method 400 includes at least the processes 401-406.

According to one embodiment, the process 401 includes: acquiring a plurality of different types of friendship chains from a relation server upon launch of an application. For example, the process 402 includes: receiving a voice-invitation signal sent by one or more friends in any type of friendship chain via the relation server, where the voice-invitation signal includes identification of a voice room. In another example, the process 403 includes: determining whether to access the voice room according to the voice-invitation signal. If it is determined to access the voice room, the process 404 is executed. Otherwise, the process 406 is executed. In yet another example, the process 404 includes: accessing the voice room via the voice server and establishing one or more voice connections associated with the one or more friends.

According to another embodiment, the process 405 includes: sending an invitation reply to the relation server, where the invitation reply contains a message of invitation acceptance, so that the relation server sends an invitation reply to the one or more friends. For example, the process 406 includes: sending an invitation reply to the relation server, where the invitation reply contains a message of invitation rejection, so that the relation server sends an invitation reply to the one or more friends. In some embodiments, the method 300 is implemented to send an invitation reply to the relation server so that the one or more friends can acquire an indication of the invitation results in a timely manner.

In certain embodiments, a client is configured to execute the method 100, the method 200, the method 300 and/or the method 400. For example, the client is installed on a terminal. In another example, the terminal includes a smart phone, a tablet, an electronic reader, a Moving Picture Experts Group Audio Layer III (MP3) player, a Moving Picture Experts Group Audio Layer IV (MP4) player, a laptop, a desktop, or other suitable devices.

Figure 5:
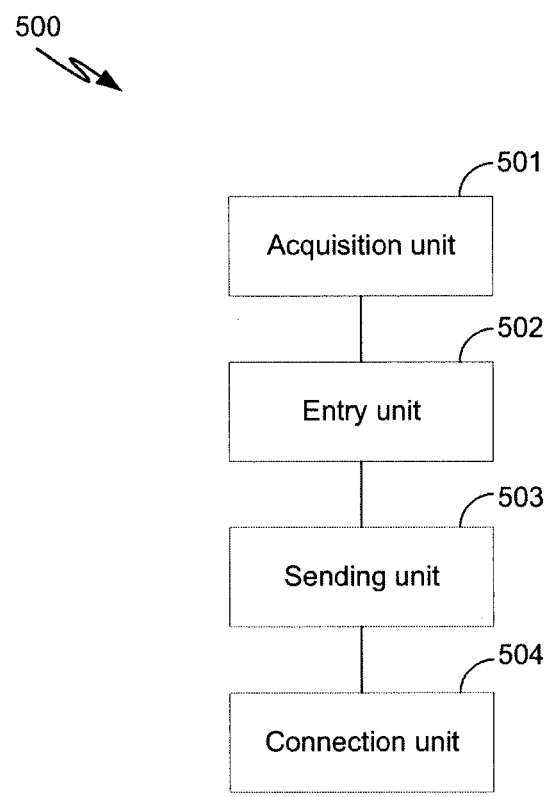
FIG. 5 is a simplified diagram showing a device for voice communication according to one embodiment of the present invention.

FIG. 5 is a simplified diagram showing a device for voice communication according to one embodiment of the present invention. This diagram is merely an example, which should not unduly limit the scope of the claims. One of ordinary skill in the art would recognize many variations, alternatives, and modifications. The device 500 includes an acquisition unit 501, an entry unit 502, a sending unit 503, and a connection unit 504.

According to one embodiment, the acquisition unit 501 is configured to acquire multiple friendship chains from a relation server upon launching an application. For example, an entry unit 502 is configured to access a voice room via a voice server upon receipt of a voice-communication request from a user. In another example, a sending unit 503 is configured to send a voice-invitation signal to the relation server, the voice-invitation signal including identification of the voice room. In yet another example, one or more friends of the user in the friendship chains determine whether to access the voice room based on at least information associated with the voice-invitation signal. In yet another example, a connection unit 504 is configured to establish one or more voice connections associated with the one or more friends via the voice server in response to the friends accessing the voice room.

According to another embodiment, the device 500 further includes: a judgment unit configured to determine whether an invitation reply is received via the relation server after the voice-invitation signal is sent to the relation server. For example, the device 500 further includes a feedback unit configured to: in response to the invitation reply being received, process the invitation reply; in response to the invitation reply including an invitation acceptance, indicate invitation success; in response to the invitation reply including a rejection of invitation, indicate invitation failure; and in response to the invitation reply not being received, terminate a process associated with the voice-invitation signal after a wait period. In another example, the entry unit 502 is further configured to: determine whether the voice room is accessed; in response to the voice room being accessed, keep the voice room accessed; and in response to the voice room not being accessed, access another voice room that is automatically generated.

Figure 6:
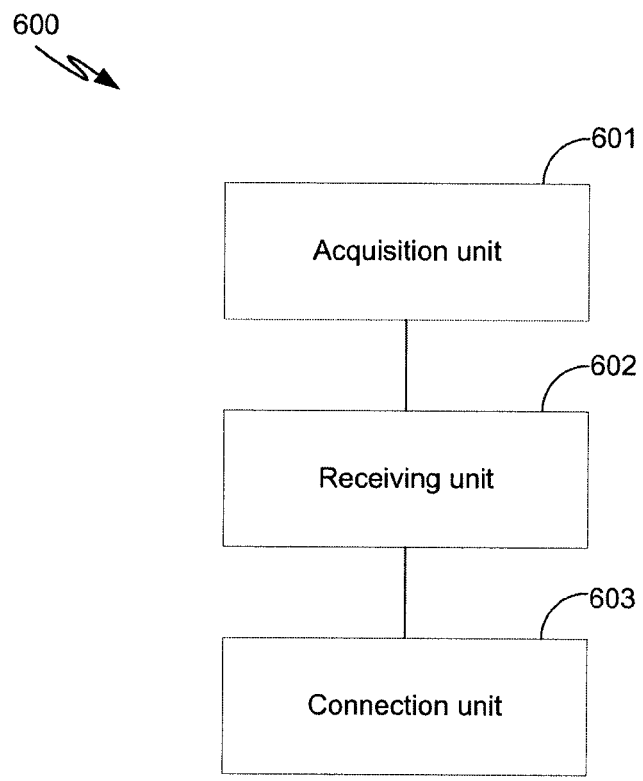
FIG. 6 is a simplified diagram showing a device for voice communication according to another embodiment of the present invention.

FIG. 6 is a simplified diagram showing a device for voice communication according to another embodiment of the present invention. This diagram is merely an example, which should not unduly limit the scope of the claims. One of ordinary skill in the art would recognize many variations, alternatives, and modifications. The device 600 includes an acquisition unit 601, a receiving unit 602, and a connection unit 603.

According to one embodiment, the acquisition unit 601 is configured to acquire multiple friendship chains from a relation server upon launching an application. For example, the receiving unit 602 is configured to receive a voice-invitation signal from one or more friends of a user in the friendship chains via the relation server, the voice-invitation signal including identification of a voice room. In another example, the connection unit 603 is configured to: determine whether to access the voice room based on at least information associated with the voice-invitation signal; in response to a determination to access the voice room, access the voice room via a voice server and establish one or more voice connections associated with the one or more friends.

According to another embodiment, the device 600 further includes: a first sending unit configured to send an invitation reply including an invitation acceptance to the relation server upon accessing the voice room, where the relation server provides the invitation reply to the one or more friends. For example, the device 600 further includes: a second sending unit configured to, in response to a determination not to access the voice room, send an invitation reply including a rejection of invitation to the relation server, wherein the relation server provides the invitation reply to the one or more friends.

In some embodiments, the device 500 and/or the device 600 can be integrated into a client with an application which receives a voice-communication request. For example, the client is installed on a terminal. In another example, the relation server acquires different types of friendship chains and realizes the interconnection of different friendship chains so that a user can conveniently search for a friend in a different relation chain for voice communications. In yet another example, different users can enter a same voice room for establishment of voice connections through receiving a voice-invitation signal that contains identification of the voice room. The client with the application can be used for initiating a voice-communication request or for receiving the voice-communication request.

Figure 7:
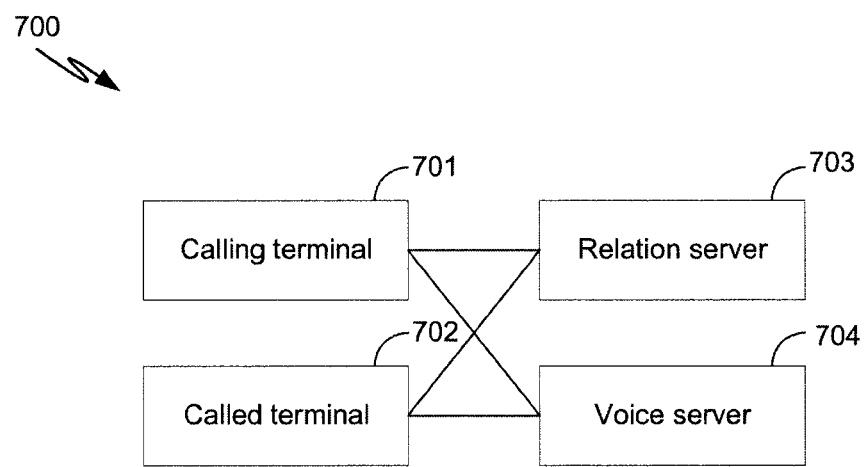
FIG. 7 is a simplified diagram showing a system for voice communication according to one embodiment of the present invention.

FIG. 7 is a simplified diagram showing a system for voice communication according to one embodiment of the present invention. This diagram is merely an example, which should not unduly limit the scope of the claims. One of ordinary skill in the art would recognize many variations, alternatives, and modifications. The system 700 includes a calling terminal 701, a called terminal 702, a relation server 703 and a voice server 704.

According to one embodiment, the calling terminal 701 is connected to the relation server 703 and the voice server 704, and the called terminal 702 is connected to the relation server 703 and the voice server 704. For example, the calling terminal 701 is configured to: acquire a plurality of different types of friendship chains from the relation server upon launch of an application; access a voice room via the voice server after receiving the voice-communication request input by the user; send voice-invitation signal to the relation server, where the voice-invitation signal includes identification of the voice room, so that one or more friends in any type of friendship chain can determine whether to access the voice room according to the voice-invitation signal; and establish the voice connection with the one or more friends via the voice server when the one or more friends enter the voice room. In another example, the called terminal 702 is configured to: acquire a plurality of different types of friendship chains from the relation server upon launch of the application; receive a voice-invitation signal sent by one or more friends in any type of friendship chain via the relation server, where the voice-invitation signal includes identification of a voice room; determine whether to access the voice room according to the voice-invitation signal; if it is determined to access the voice room, access the voice room via a voice server and establish voice connection with the one or more friends. In yet another example, the relation server 703 is configured to send a plurality of different types of friendship chains to the calling terminal 701 upon launch of an application on the calling terminal 701, receive a voice-invitation signal sent by the calling terminal 701 and send the voice-invitation signal to the called terminal 702. In yet another example, the voice server 704 is configured to create a voice room and establish voice connections between the calling terminal and the called terminal.

In some embodiments, the calling terminal 701 can also be configured to determine if an invitation reply is received via the relation server after sending the voice-invitation signal to the relation server. For example, if the invitation reply is received, the calling terminal 701 processes the invitation reply and indicates success of invitation if the invitation reply contains a message of invitation acceptance or indicates failure of invitation if the invitation reply contains a message of invitation rejection. In another example, if no invitation reply is received, the calling terminal 701 is configured to terminate the voice-invitation process after a predetermined wait period. In yet another example, the calling terminal 701 is further configured to determine if the voice room is currently accessed (e.g., by the user). As an example, if so, the user remains in the current voice room. Otherwise, the user enters an automatically-created voice room.

In certain embodiments, the called terminal 702 is configured to send an invitation reply to the relation server after the voice room is accessed, where the invitation reply contains a message of invitation acceptance. For example, the relation server 703 sends the invitation reply to the one or more friends. In another example, if it is determined not to access the voice room, an invitation reply is sent to the relation server, where the invitation reply contains a message of invitation rejection, so that the relation server sends the invitation reply to the one or more friends.

Figure 8:
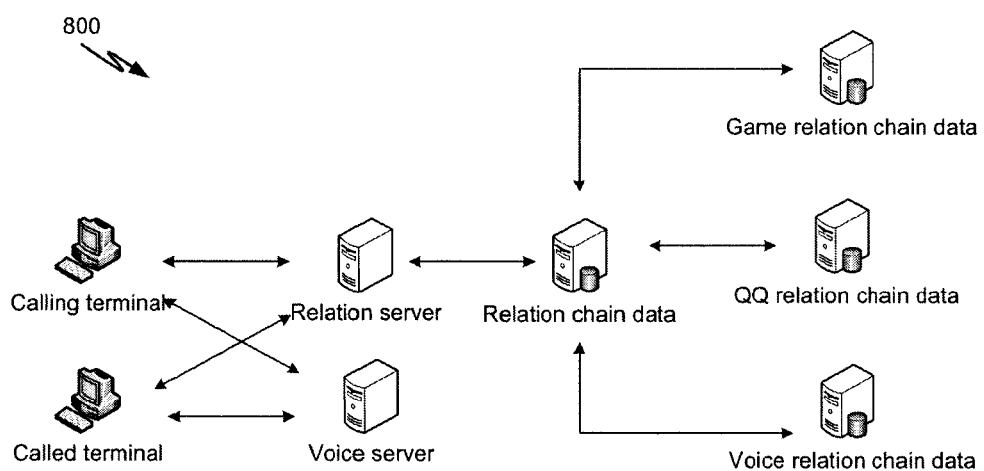
FIG. 8 is a simplified diagram showing a system for voice communication according to another embodiment of the present invention.

FIG. 8 is a simplified diagram showing a system for voice communication according to another embodiment of the present invention. This diagram is merely an example, which should not unduly limit the scope of the claims. One of ordinary skill in the art would recognize many variations, alternatives, and modifications. The system 800 includes a calling terminal, a called terminal, a relation server and a voice server.

According to one embodiment, the relation server summarizes the data of different relation chains, such as a game relation chain, a QQ relation chain, and/or a voice relation chain. For example, the calling terminal and the called terminal acquire a plurality of different types of friendship chains (e.g., the game relation chain, the QQ relation chain, and/or the voice relation chain) from the relation server upon launch of an application. In another example, the calling terminal accesses a voice room via the voice server upon receipt of a voice-communication request input by a user, selects one or more friends in any type of friendship chain and sends to the relation server a voice-invitation signal which contains the identification of the voice room. In yet another example, the relation server receives the voice-invitation signal and sends the voice-invitation signal to a selected called terminal. In yet another example, the called terminal receives the voice-invitation signal, determines whether to access the voice room according to the voice-invitation signal, and enters the voice room via the voice server if it is determined to access the voice room. In yet another example, when the called terminal enters the voice room, one or more voice connections are established between the calling terminal and the called terminal.

Figure 9:
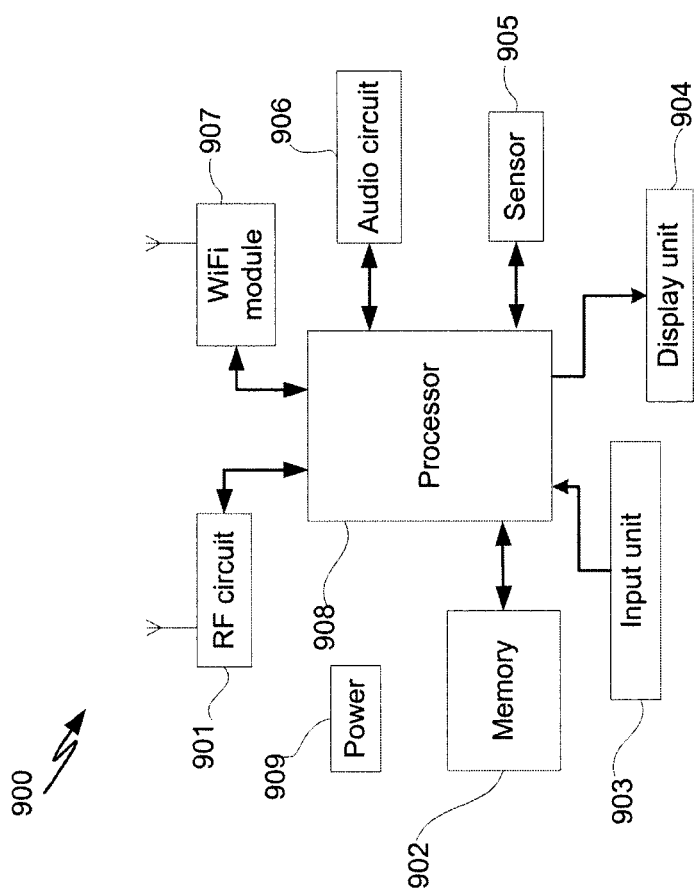
FIG. 9 is a simplified diagram showing a terminal for voice communication according to some embodiments of the present invention.

FIG. 9 is a simplified diagram showing a terminal for voice communication according to some embodiments of the present invention. This diagram is merely an example, which should not unduly limit the scope of the claims. One of ordinary skill in the art would recognize many variations, alternatives, and modifications. The terminal 900 is used to execute the methods as shown in FIG. 1, FIG. 2, FIG. 3, and/or FIG. 4.

According to one embodiment, the terminal 900 includes a RF circuit 901, a memory 902 that includes one or more computer-readable storage medium, an input unit 903, a display unit 904, a sensor 905, an audio circuit 906, a WiFi (e.g., wireless fidelity) module 907, one or more processors 908 that includes one or more processing cores, and a power supply 909. For example, the RF circuit 901 is configured to send/receive messages or signals in communication. As an example, the RF circuit 901 receives a base station's downlink information, delivers to the processors 908 for processing, and sends uplink data to the base station. For example, the RF circuit 901 includes an antenna, at least one amplifier, a tuner, one or several oscillators, SIM (Subscriber Identity Module) card, a transceiver, a coupler, an LNA (Low Noise Amplifier) and a duplexer. In another example, the RF circuit 901 communicates with the network and other equipments via wireless communication based on any communication standard or protocols, such as GSM (Global System of Mobile communication), GPRS (General Packet Radio Service), CDMA (Code Division Multiple Access), WCDMA (Wideband Code Division Multiple Access), LTE (Long Term Evolution), email, SMS (Short Messaging Service), etc.

According to another embodiment, the memory 902 is configured to store software programs and modules. For example, the processors 908 are configured to execute various functional applications and data processing by running the software programs and modules stored in the memory 902. The memory 902 includes a program storage area and a data storage area, where the program storage area may store the operating system, and the application(s) required by one or more functions (e.g., an audio player or a video player), in some embodiments. For example, the data storage area stores the data created based on the use of the terminal 900 (e.g., audio data or a phone book). In another example, the memory 902 includes a high-speed random access storage, a non-volatile memory, one or more floppy disc storage devices, a flash storage device or other volatile solid storage devices. As an example, the memory 902 further includes a memory controller to enable access to the memory 902 by the processors 908 and the input unit 903.

According to yet another embodiment, the input unit 903 is configured to receive an input number or character data and generate inputs for a keyboard, a mouse, and a joystick, optical or track signals relating to user setting and functional control. For example, the input unit 903 includes a touch-sensitive surface and other input devices. The touch-sensitive surface (e.g., a touch screen or a touch panel) is configured to receive the user's touch operations thereon or nearby (e.g., the user's operations on or near the touch-sensitive surface with a finger, a touch pen or any other appropriate object or attachment) and drive the corresponding connected devices according to the predetermined program. For example, the touch-sensitive surface includes two parts, namely a touch detector and a touch controller. The touch detector detects the position of user touch and the signals arising from such touches and sends the signals to the touch controller. The touch controller receives touch data from the touch detector, converts the touch data into the coordinates of the touch point, sends the coordinates to the processors 908 and receives and executes the commands received from the processors 908. For example, the touch-sensitive surface is of a resistance type, a capacitance type, an infrared type and a surface acoustic wave type. In another example, other than the touch-sensitive surface, the input unit 903 includes the other input devices. For example, the other input devices include one or more physical keyboards, one or more functional keys (e.g., volume control keys or switch keys), a track ball, a mouse and/or a joystick.

According to yet another embodiment, the display unit 904 is configured to display data input from a user or provided to the user, and includes various graphical user interfaces of the terminal 900. For example, these graphical user interfaces include graphs, texts, icons, videos and a combination thereof. The display unit 904 includes a display panel which contains a LCD (liquid crystal display), an OLED (organic light-emitting diode). As an example, the touch-sensitive surface can cover the display panel. For example, upon detecting any touch operations thereon or nearby, the touch-sensitive surface sends signals to the processors 908 to determine the type of the touch events and then the processors 908 provides corresponding visual outputs on the display panel according to the type of the touch events. Although the touch-sensitive surface and the display panel are two independent parts for input and output respectively, the touch-sensitive surface and the display panel can be integrated for input and output, in some embodiments.

In one embodiment, the terminal 900 includes a sensor 905 (e.g., an optical sensor, a motion sensor or other sensors). For example, the sensor 905 includes an environment optical sensor and adjusts the brightness of the display panel according to the environmental luminance. In another example, the sensor 905 includes a proximity sensor and turns off or backlights the display panel when the terminal 900 moves close to an ear of a user. In yet another example, the sensor 905 includes a motion sensor (e.g., a gravity acceleration sensor) and detects a magnitude of acceleration in all directions (e.g., three axes). Particularly, the sensor 905 detects a magnitude and a direction of gravity when staying still. In some embodiments, the sensor 905 is used for identifying movements of a cell phone (e.g., a switch of screen direction between horizontal and vertical, related games, and a calibration related to a magnetometer) and features related to vibration identification (e.g., a pedometer or a strike). In certain embodiments, the sensor 905 includes a gyroscope, a barometer, a hygroscope, a thermometer and/or an infrared sensor.

In another embodiment, the audio circuit 906, a speaker, and a microphone are configured to provide an audio interface between a user and the terminal 900. For example, the audio circuit 906 is configured to transmit electrical signals converted from certain audio data to the speaker that converts such electrical signals into some output audio signals. In another example, the microphone is configured to convert audio signals into electrical signals which are converted into audio data by the audio circuit 906. The audio data are processed in the processors 908 and received by the RF circuit 901 before being sent to another terminal, in some embodiments. For example, the audio data are output to the memory 902 for further processing. As an example, the audio circuit 906 includes an earphone jack for communication between a peripheral earphone and the terminal 900.

WiFi is a short-distance wireless transmission technology. In some embodiments, through the WiFi module 907, the terminal 900 enables the user to receive and send emails, browse webpages, and/or access stream media. For example, the terminal 900 is configured to provide the user with a wireless broadband Internet access. In some embodiments, the WiFi module 907 is omitted in the terminal 900.

According to one embodiment, the processors 908 are the control center of the terminal 900. For example, the processors 908 is connected to various parts of the terminal 900 (e.g., a cell phone) via various interfaces and circuits, and executes various features of the terminal 900 and processes various data through operating or executing the software programs and/or modules stored in the memory 902 and calling the data stored in the memory 902, so as to monitor and control the terminal 900 (e.g., a cell phone). As an example, the processors 908 include one or more processing cores. In another example, the processors 908 is integrated with an application processor and a modem processor, where the application processor mainly handles the operating system, the user interface and the applications and the modem processor mainly handles wireless communications. In some embodiments, the modem processor is not integrated into the processors 908.

According to another embodiment, the terminal 900 includes the power supply 909 (e.g., a battery) that powers up various parts. For example, the power supply 909 is logically connected to the processors 908 via a power source management system so that the charging, discharging and power consumption can be managed via the power source management system. In another example, the power supply 909 includes one or more DC or AC power sources, a recharging system, a power-failure-detection circuit, a power converter, an inverter, a power source state indicator, or other components. In yet another example, the terminal 900 includes a camcorder, a Bluetooth module, etc. Specifically, the processors 908 of the terminal 900 load executable files associated with one or more applications to the memory 902 and run the applications stored in the memory 902 according to the method 100, the method 200, the method 300 and/or the method 400.

According to one embodiment, a method is provided for voice communication. For example, multiple friendship chains are acquired from a relation server upon launching an application; a voice room is accessed via a voice server upon receipt of a voice-communication request from a user; a voice-invitation signal is sent to the relation server, the voice-invitation signal including identification of the voice room, where one or more friends of the user in the friendship chains determine whether to access the voice room based on at least information associated with the voice-invitation signal; and one or more voice connections associated with the one or more friends are established via the voice server in response to the friends accessing the voice room. For example, the method is implemented according to at least FIG. 1 and/or FIG. 2.

According to another embodiment, a method is provided for voice communication. For example, multiple friendship chains are acquired from a relation server upon launching an application; a voice-invitation signal is received from one or more friends of a user in the friendship chains via the relation server, the voice-invitation signal including identification of a voice room; whether to access the voice room is determined based on at least information associated with the voice-invitation signal; in response to a determination to access the voice room, the voice room is accessed via a voice server; and one or more voice connections associated with the one or more friends are established. For example, the method is implemented according to at least FIG. 3 and/or FIG. 4.

According to yet another embodiment, a device for voice communication includes: an acquisition unit, an entry unit, a sending unit, and a connection unit. The acquisition unit is configured to acquire multiple friendship chains from a relation server upon launching an application. The entry unit is configured to access a voice room via a voice server upon receipt of a voice-communication request from a user. The sending unit is configured to send a voice-invitation signal to the relation server, the voice-invitation signal including identification of the voice room. One or more friends of the user in the friendship chains determine whether to access the voice room based on at least information associated with the voice-invitation signal. The connection unit is configured to establish one or more voice connections associated with the one or more friends via the voice server in response to the friends accessing the voice room. For example, the device is implemented according to at least FIG. 5.

In one embodiment, a device for voice communication includes: an acquisition unit, a receiving unit and a connection unit. The acquisition unit is configured to acquire multiple friendship chains from a relation server upon launching an application. The receiving unit is configured to receive a voice-invitation signal from one or more friends of a user in the friendship chains via the relation server, the voice-invitation signal including identification of a voice room. The connection unit is configured to: determine whether to access the voice room based on at least information associated with the voice-invitation signal; in response to a determination to access the voice room, access the voice room via a voice server and establish one or more voice connections associated with the one or more friends. For example, the device is implemented according to at least FIG. 6.

In another embodiment, a system for voice communication includes: a calling terminal, a called terminal, a relation server, and a voice server. The calling terminal is connected to the relation server and the voice server. The called terminal is connected to the relation server and the voice server. The calling terminal includes: a first acquisition unit configured to acquire multiple friendship chains from the relation server upon launching an application, an entry unit configured to access a voice room via the voice server upon receipt of a voice-communication request from a user, a first sending unit configured to send a voice-invitation signal to the relation server, the voice-invitation signal including identification of the voice room, where one or more friends of the user in the friendship chains determine whether to access the voice room based on at least information associated with the voice-invitation signal, and a connection unit configured to establish one or more voice connections associated with the one or more friends via the voice server in response to the friends accessing the voice room. The called terminal includes: a second acquisition unit configured to acquire the friendship chains from the relation server upon launching the application, a receiving unit configured to receive the voice-invitation signal associated with the one or more friends in the friendship chains via the relation server, and a connection unit configured to: determine whether to access the voice room based on at least information associated with the voice-invitation signal, in response to a determination to access the voice room, access the voice room via the voice server and establish the voice connections associated with the one or more friends. The relation server is configured to send the friendship chains to the calling terminal upon launching the application on the calling terminal, receive the voice-invitation signal sent by the calling terminal and send the voice-invitation signal to the called terminal. The voice server is configured to create the voice room and establish the voice connections between the calling terminal and the called terminal. For example, the system is implemented according to at least FIG. 7 and/or FIG. 8.

In yet another embodiment, a non-transitory computer readable storage medium includes programming instructions for voice communication. The programming instructions configured to cause one or more data processors to execute certain operations. For example, multiple friendship chains are acquired from a relation server upon launching an application; a voice room is accessed via a voice server upon receipt of a voice-communication request from a user; a voice-invitation signal is sent to the relation server, the voice-invitation signal including identification of the voice room, where one or more friends of the user in the friendship chains determine whether to access the voice room based on at least information associated with the voice-invitation signal; and one or more voice connections associated with the one or more friends are established via the voice server in response to the friends accessing the voice room. For example, the storage medium is implemented according to at least FIG. 1 and/or FIG. 2.

In yet another embodiment, a non-transitory computer readable storage medium includes programming instructions for execution of electronic games. The programming instructions configured to cause one or more data processors to execute certain operations. For example, multiple friendship chains are acquired from a relation server upon launching an application; a voice-invitation signal is received from one or more friends of a user in the friendship chains via the relation server, the voice-invitation signal including identification of a voice room; whether to access the voice room is determined based on at least information associated with the voice-invitation signal; in response to a determination to access the voice room, the voice room is accessed via a voice server; and one or more voice connections associated with the one or more friends are established. For example, the storage medium is implemented according to at least FIG. 3 and/or FIG. 4.

The above only describes several scenarios presented by this invention, and the description is relatively specific and detailed, yet it cannot therefore be understood as limiting the scope of this invention's patent. It should be noted that ordinary technicians in the field may also, without deviating from the invention's conceptual premises, make a number of variations and modifications, which are all within the scope of this invention. As a result, in terms of protection, the patent claims shall prevail.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Additionally, the methods and systems described herein may be implemented on many different types of processing devices by program code comprising program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, Flash memory, flat files, databases, programming data structures, programming variables, IF-THEN (or similar type) statement constructs, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, etc.) that contain instructions (e.g., software) for use in execution by a processor to perform the methods' operations and implement the systems described herein.

The computer components, software modules, functions, data stores and data structures described herein may be connected directly or indirectly to each other in order to allow the flow of data needed for their operations. It is also noted that a module or processor includes but is not limited to a unit of code that performs a software operation, and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

While this specification contains many specifics, these should not be construed as limitations on the scope or of what may be claimed, but rather as descriptions of features specific to particular embodiments. Certain features that are described in this specification in the context or separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

The invention claimed is:

1. A method for voice communication, the method comprising:
    acquiring multiple friendship chains from a relation server upon launching an application;
    accessing a voice room via a voice server upon receipt of a voice-communication request from a user;
    sending a voice-invitation signal to the relation server, the voice-invitation signal including identification of the voice room;
    wherein one or more friends of the user in the friendship chains determine whether to access the voice room based on at least information associated with the voice-invitation signal; and
    establishing one or more voice connections associated with the one or more friends via the voice server in response to the friends accessing the voice room.

2. The method of claim 1, further comprising:
    determining whether an invitation reply is received via the relation server after the voice-invitation signal is sent to the relation server;
    in response to the invitation reply being received, processing the invitation reply;
        in response to the invitation reply including an invitation acceptance, indicating invitation success;
        in response to the invitation reply including a rejection of invitation, indicating invitation failure; and
    in response to the invitation reply not being received, terminating a process associated with the voice-invitation signal after a wait period.

3. The method of claim 1, wherein the accessing a voice room includes:
    determining whether the voice room is accessed;
        in response to the voice room being accessed, keeping the voice room accessed; and
        in response to the voice room not being accessed, accessing another voice room that is automatically generated.

4. A method for voice communication, the method comprising:
    acquiring multiple friendship chains from a relation server upon launching an application;
    receiving a voice-invitation signal from one or more friends of a user in the friendship chains via the relation server, the voice-invitation signal including identification of a voice room;
    determining whether to access the voice room based on at least information associated with the voice-invitation signal;
    in response to a determination to access the voice room, accessing the voice room via a voice server; and
    establishing one or more voice connections associated with the one or more friends.

5. The method of claim 4, further comprising:
    sending an invitation reply including an invitation acceptance to the relation server upon accessing the voice room, wherein the relation server provides the invitation reply to the one or more friends.

6. The method of claim 4, further comprising:
    in response to a determination not to access the voice room, sending an invitation reply including a rejection of invitation to the relation server, wherein the relation server provides the invitation reply to the one or more friends.

7. A device for voice communication, the device comprising:
    an acquisition unit configured to acquire multiple friendship chains from a relation server upon launching an application;
    an entry unit configured to access a voice room via a voice server upon receipt of a voice-communication request from a user;
    a sending unit configured to send a voice-invitation signal to the relation server, the voice-invitation signal including identification of the voice room;
    wherein one or more friends of the user in the friendship chains determine whether to access the voice room based on at least information associated with the voice-invitation signal; and
    a connection unit configured to establish one or more voice connections associated with the one or more friends via the voice server in response to the friends accessing the voice room.

8. The device of claim 7, further comprising:
    a judgment unit configured to determine whether an invitation reply is received via the relation server after the voice-invitation signal is sent to the relation server; and
    a feedback unit configured to:
        in response to the invitation reply being received, process the invitation reply;
            in response to the invitation reply including an invitation acceptance, indicate invitation success;
            in response to the invitation reply including a rejection of invitation, indicate invitation failure; and
        in response to the invitation reply not being received, terminate a process associated with the voice-invitation signal after a wait period.

9. The device of claim 7, wherein the entry unit is further configured to:
    determine whether the voice room is accessed;
        in response to the voice room being accessed, keep the voice room accessed; and
        in response to the voice room not being accessed, access another voice room that is automatically generated.

10. The device of claim 7, further comprising:
    one or more data processors; and
    a computer-readable storage medium;
    wherein one or more of the acquisition unit, the entry unit, the sending unit, and the connection unit are stored in the storage medium and configured to be executed by the one or more data processors.

11. A device for voice communication, the device comprising:
    an acquisition unit configured to acquire multiple friendship chains from a relation server upon launching an application;
    a receiving unit configured to receive a voice-invitation signal from one or more friends of a user in the friendship chains via the relation server, the voice-invitation signal including identification of a voice room; and a connection unit configured to:
- determine whether to access the voice room based on at least information associated with the voice-invitation signal;
- in response to a determination to access the voice room, access the voice room via a voice server; and
- establish one or more voice connections associated with the one or more friends.

12. The device of claim 11, further comprising:
a first sending unit configured to send an invitation reply including an invitation acceptance to the relation server upon accessing the voice room, wherein the relation server provides the invitation reply to the one or more friends.

13. The device of claim 11, further comprising:
a second sending unit configured to, in response to a determination not to access the voice room, send an invitation reply including a rejection of invitation to the relation server, wherein the relation server provides the invitation reply to the one or more friends.

14. The device of claim 11, further comprising:
one or more data processors; and
a computer-readable storage medium;
wherein one or more of the acquisition unit, the receiving unit and the connection unit are stored in the storage medium and configured to be executed by the one or more data processors.

15. A system for voice communication, the system comprising:
a calling terminal;
a called terminal;
a relation server; and
a voice server;
wherein:
the calling terminal is connected to the relation server and the voice server;
the called terminal is connected to the relation server and the voice server;
wherein the calling terminal includes:
- a first acquisition unit configured to acquire multiple friendship chains from the relation server upon launching an application;
- an entry unit configured to access a voice room via the voice server upon receipt of a voice-communication request from a user;
- a first sending unit configured to send a voice-invitation signal to the relation server, the voice-invitation signal including identification of the voice room;
- wherein one or more friends of the user in the friendship chains determine whether to access the voice room based on at least information associated with the voice-invitation signal; and
- a connection unit configured to establish one or more voice connections associated with the one or more friends via the voice server in response to the friends accessing the voice room;
wherein the called terminal includes:
- a second acquisition unit configured to acquire the friendship chains from the relation server upon launching the application;
- a receiving unit configured to receive the voice-invitation signal associated with the one or more friends in the friendship chains via the relation server; and
- a connection unit configured to:
  - determine whether to access the voice room based on at least information associated with the voice-invitation signal;
  - in response to a determination to access the voice room,
    - access the voice room via the voice server; and
    - establish the voice connections associated with the one or more friends;
the relation server is configured to send the friendship chains to the calling terminal upon launching the application on the calling terminal, receive the voice-invitation signal sent by the calling terminal and send the voice-invitation signal to the called terminal; and
the voice server is configured to create the voice room and establish the voice connections between the calling terminal and the called terminal.

16. The system of claim 15, wherein the calling terminal further includes:
a judgment unit configured to determine whether an invitation reply is received via the relation server after the voice-invitation signal is sent to the relation server; and
a feedback unit configured to:
- in response to the invitation reply being received, process the invitation reply;
- in response to the invitation reply including an invitation acceptance, indicate invitation success;
- in response to the invitation reply including a rejection of invitation, indicate invitation failure; and
- in response to the invitation reply not being received, terminate a process associated with the voice-invitation signal after a wait period.

17. The system of claim 15, wherein the entry unit is further configured to:
determine whether the voice room is accessed;
- in response to the voice room being accessed, keep the voice room accessed; and
- in response to the voice room not being accessed, access another voice room that is automatically generated.

18. The system of claim 15, wherein the called terminal further includes:
a second sending unit configured to send an invitation reply including an invitation acceptance to the relation server upon accessing the voice room, wherein the relation server provides the invitation reply to the one or more friends.

19. The system of claim 15, wherein the called terminal further includes:
a third sending unit configured to, in response to a determination not to access the voice room, send an invitation reply including a rejection of invitation to the relation server, wherein the relation server provides the invitation reply to the one or more friends.

20. A non-transitory computer readable storage medium comprising programming instructions for voice communication, the programming instructions configured to cause one or more data processors to execute operations comprising:
acquiring multiple friendship chains from a relation server upon launching an application;
accessing a voice room via a voice server upon receipt of a voice-communication request from a user;
sending a voice-invitation signal to the relation server, the voice-invitation signal including identification of the voice room;
wherein one or more friends of the user in the friendship chains determine whether to access the voice room based on at least information associated with the voice-invitation signal; and establishing one or more voice connections associated with the one or more friends via the voice server in response to the friends accessing the voice room.

21. A non-transitory computer readable storage medium comprising programming instructions for voice communication, the programming instructions configured to cause one or more data processors to execute operations comprising:
   acquiring multiple friendship chains from a relation server upon launching an application;
   receiving a voice-invitation signal from one or more friends of a user in the friendship chains via the relation server, the voice-invitation signal including identification of a voice room;
   determining whether to access the voice room based on at least information associated with the voice-invitation signal;
   in response to a determination to access the voice room, accessing the voice room via a voice server; and
   establishing one or more voice connections associated with the one or more friends.

\* \* \* \* \*